No. 844,594. PATENTED FEB. 19, 1907.
F. H. HASKELL.
FISHING NET.
APPLICATION FILED NOV. 22, 1906.
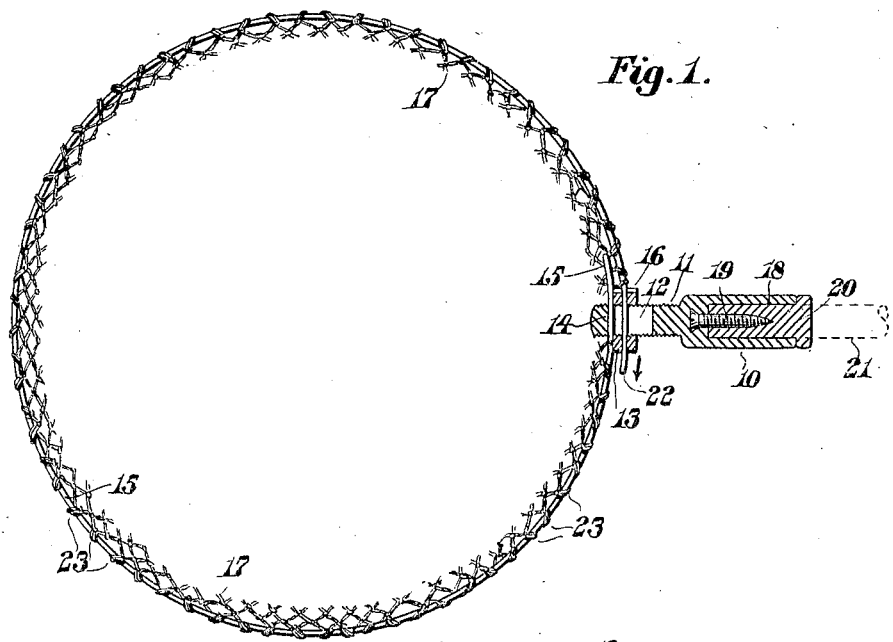
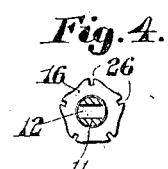
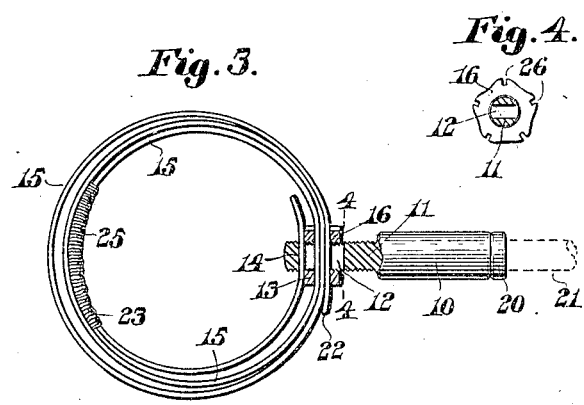
Witnesses:
Nathan C. Lombard
Howard Hanscom
Inventor:
Frank H. Haskell,
by Walter E. Lombard,
Atty.

UNITED STATES PATENT OFFICE.

FRANK H. HASKELL, OF BOSTON, MASSACHUSETTS, ASSIGNOR OF ONE-HALF TO THOMAS J. SMITH, OF BOSTON, MASSACHUSETTS.

FISHING-NET.

No. 844,584.  Specification of Letters Patent.  Patented Feb. 19, 1907.

Application filed November 22, 1906. Serial No. 344,533.

*To all whom it may concern:*

Be it known that I, FRANK H. HASKELL, a citizen of the United States of America, and a resident of Boston, in the county of Suffolk and State of Massachusetts, have invented certain new and useful Improvements in Fishing-Nets, of which the following is a specification.

This invention relates to fishing-nets, and has for its object the production of a net which is adapted to collapse and to be clamped when in collapsed condition, thereby retaining it in a form in which it may be readily carried in the pocket of a fisherman and is an improvement upon the invention shown and described in a patent issued to me November 6, 1906, No. 834,905.

The invention consists in certain novel features of construction and arrangement of parts which will be readily understood by reference to the description of the drawings and to the claims hereinafter given.

Of the drawings, Figure 1 represents a sectional plan of a net embodying the features of the invention, only a portion of the net being shown upon its supporting-rim. Fig. 2 represents an elevation of the same, a portion of the handle-tip being broken in section to show one of the clamping members. Fig. 3 represents a plan view, partially in section, of the same in collapsed condition ready for insertion in the pocket of the user; and Fig. 4 represents a section of the handle, showing its clamping-nut in position thereon, the same being cut on line 4 4 on Fig. 3.

Similar characters designate like parts throughout the several figures of the drawings.

In the drawings, 10 represents a suitable handle-tip provided with a threaded shank 11, through which is cut a transverse slot 12, extending nearly to the outer end of said threaded shank 11. Mounted upon the threaded shank 11 is a nut 13, which is adapted to clamp firmly between the outer face 14 of the slot 12 and said nut 13 one end of a collapsible rim 15. The other end of said collapsible rim 15 is also inserted in the slot 12 to the rear of the nut 13 and is clamped against said nut by means of a second nut 16, also mounted upon the threaded shank 11 of the handle-tip 10.

The net 17 is placed upon the collapsible rim 15 in any ordinary manner. The handle-tip 10 is provided with a cylindrical chamber 18, into which projects a wood-screw 19, cast or otherwise secured in the handle-tip 10 in such a manner that the point thereof does not project beyond the open end of said chamber 18. Ordinarily when not in use the chamber 18 is filled by the headed plug 20, which entirely fills said chamber and is secured therein by means of the screw 19. By this means when the device is not in use the chamber is kept free and ready for use at all times.

When it is desired to use the net, the plug 20 is removed and any suitable handle 21, such as shown in dotted lines, is inserted within the chamber 18 and is secured to the handle-tip by means of the screw 19. The walls of the chamber 18 protect the end of the handle 21 when the screw 19 is being inserted therein and prevents said handle from splitting.

As shown in Fig. 1, the collapsible net-supporting rim 15 is extended practically to its full diameter, and each end thereof is independently clamped in position by means of a nut 13 or 16. The diameter of the net may be readily decreased by loosening the nut 16 and moving the end 22 of the ring 15 in the direction of the arrow on Fig. 1 and again clamping the end 22 in its new adjusted position by means of said nut 16. While this is being accomplished, the nut 13 retains the opposite end of the rim in its normal position.

If desired, the end 22 may be moved through the slot 12, so that it makes a complete circuit and again enters the slot 12 to be clamped by means of said nut 16, thereby greatly decreasing the size of the net and at the same time materially strengthening the same. The end may be passed through the loops 23 of the net in doing this, or it may pass around the outside of these loops, thereby affording a protection for the same.

While in the drawings the preferred method of clamping the ends of the collapsible rim is shown, each end being clamped independently of the other by means of a separate nut 13 or 16, it is obvious that, if desired, the end 22 may be placed in the slot 12 adjacent to the opposite end of said rim 15 and the two ends clamped together against the shouldered end 14 of said transverse slot 12 by means of the nut 13 and the nut 16 utilized as a check-nut therefor. The preferred form, however, is that shown in the drawings, as by this means one end of the collapsible rim 15 is always held in position while the size of the net is being adjusted or being changed into the position shown in Fig. 3 for insertion in the pocket or other receptacle.

When the net is not in use and it is desired to transport it from one place to another, the clamping-nut 16 is loosened, and the end 22 of the rim 15 is passed through the slot 12 as many times as possible, so as to reduce the diameter of the spiral windings of said rim to a minimum, and then the nut 16 is caused to clamp the same in its adjusted position against the nut 13. The handle 21 is removed and the plug 20 inserted. The net is collected at one point, as shown in Fig. 3 at 25, and the whole device is then in suitable form for conveyance in a fisherman's pocket. The nuts 13 and 16 are constructed in the form shown in Fig. 4, with a plurality of slots 26 therein adapted to receive the edge of a penny or dime, so that they may be readily adjusted on the threaded shank 11 by means of these coins.

It is believed that the advantages and the operation of the invention will be fully understood from the foregoing description.

Having thus described my invention, I claim—

1. In a fishing-net, the combination of a net-supporting rim; a handle-tip provided with a longitudinal opening for the reception of the end of the handle and means for securing it to said handle and a transverse opening adapted to receive the ends of said rim; and means surrounding the outer periphery of said tip and adjustable longitudinally of said handle for clamping the ends of said rim thereto.

2. In a fishing-net, the combination of a net-supporting rim; a handle-tip provided with means for securing it to a handle and a longitudinal opening for the reception of the end of the handle and an exteriorly-threaded shank having a transverse opening therein adapted to receive the ends of said rim; and means threaded to the exterior of said shank adapted to clamp the ends of said rim thereto.

3. In a fishing-net, the combination of a net-supporting rim; a handle-tip provided with a threaded shank having a transverse opening adapted to receive the ends of said rim; a nut for clamping one end of said rim against the end of said opening; and a second nut for clamping the opposite end of said rim against the other nut.

4. In a fishing-net, the combination of a net-supporting rim; a handle-tip provided with means for securing it to a handle and a longitudinal opening for the reception of the end of the handle and a transverse opening adapted to receive the ends of said rim; and a nut threaded to the outer periphery of said tip and adjustable longitudinally thereof for clamping the ends of said rim thereto.

5. In a fishing-net, the combination of a net-supporting rim; a handle-tip provided with a transverse opening adapted to receive the ends of said rim; and two nuts threaded to the outer periphery of said tip and adjustable longitudinally thereof for clamping the ends of said rim thereto.

6. In a fishing-net, the combination of a net-supporting rim; a handle-tip provided with a threaded shank having a transverse opening adapted to receive the ends of said rim; and clamping-nuts on said threaded shank provided with radial slots.

Signed by me at Boston, Massachusetts, this 14th day of November, 1906.

FRANK H. HASKELL.

Witnesses:
WALTER E. LOMBARD,
EDNA C. CLEVELAND.